US012717030B2

(12) United States Patent
Nakamura

(10) Patent No.: US 12,717,030 B2
(45) Date of Patent: Aug. 25, 2026

(54) DISTANCE MEASURING SYSTEM

(71) Applicant: SONY SEMICONDUCTOR SOLUTIONS CORPORATION, Kanagawa (JP)

(72) Inventor: Masashi Nakamura, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 930 days.

(21) Appl. No.: 17/911,513

(22) PCT Filed: Jan. 29, 2021

(86) PCT No.: PCT/JP2021/003259
§ 371 (c)(1),
(2) Date: Sep. 14, 2022

(87) PCT Pub. No.: WO2021/192605
PCT Pub. Date: Sep. 30, 2021

(65) Prior Publication Data

US 2023/0105824 A1 Apr. 6, 2023

(30) Foreign Application Priority Data

Mar. 26, 2020 (JP) ................................ 2020-055951

(51) Int. Cl.
*G01S 17/10* (2020.01)
*G01B 11/02* (2006.01)
(Continued)

(52) U.S. Cl.
CPC ............ *G01S 17/10* (2013.01); *G01B 11/026* (2013.01); *G01S 7/4814* (2013.01); *G01S 7/4861* (2013.01); *G01S 7/4865* (2013.01)

(58) Field of Classification Search
CPC ...... G01S 17/10; G01S 7/4814; G01S 7/4861; G01S 7/4865; G01S 7/4811;
(Continued)

(56) References Cited

U.S. PATENT DOCUMENTS 11,709,240 B2 * 7/2023 Rezk .................... G01S 7/4815 356/4.01
2008/0304043 A1 12/2008 Benz
(Continued)

FOREIGN PATENT DOCUMENTS

JP H09-318743 12/1997
JP 2008-185563 8/2008
(Continued)

OTHER PUBLICATIONS

International Search Report and Written Opinion prepared by the Japan Patent Office on Apr. 5, 2021, for International Application No. PCT/JP2021/003259, 2 pgs.

*Primary Examiner* — Joshua D Huson
*Assistant Examiner* — Vicente Rodriguez
(74) *Attorney, Agent, or Firm* — SHERIDAN ROSS P.C.

(57) ABSTRACT

A distance measuring system according to an aspect of the present technology includes: two light sources outputting light having different wavelengths; a light source side optical member configured to change a direction of a part of light output from each of the two light sources; a reference time side light receiving unit on which light output by one of the two light sources, and changed in direction by the light source side optical member is incident; a distance calculation side light receiving unit on which light output by the other of the two light sources, transmitted through the light source side optical member, and reflected by an object (Obj) is incident; a reference time calculating unit; and a distance calculating unit.

20 Claims, 5 Drawing Sheets

(51) Int. Cl.
*G01S 7/481* (2006.01)
*G01S 7/4861* (2020.01)
*G01S 7/4865* (2020.01)

(58) Field of Classification Search
CPC ........ G01S 7/4815; G01S 17/08; G01S 17/42; G01S 7/4863; G01S 7/481; G01B 11/026; G01C 3/08; G01C 3/06
See application file for complete search history.

(56) References Cited

U.S. PATENT DOCUMENTS

| | | | | |
|---|---|---|---|---|
| 2009/0091739 | A1* | 4/2009 | Kim | G01S 17/10<br>356/5.09 |
| 2012/0130588 | A1* | 5/2012 | Hukkeri | G01S 7/4815<br>356/4.01 |
| 2013/0300838 | A1* | 11/2013 | Borowski | H04N 25/00<br>348/46 |
| 2019/0011567 | A1* | 1/2019 | Pacala | G01S 17/89 |
| 2019/0033433 | A1* | 1/2019 | Ryu | H10F 77/953 |
| 2019/0204419 | A1* | 7/2019 | Baba | G02B 6/124 |

FOREIGN PATENT DOCUMENTS

| | | |
|---|---|---|
| JP | 2010-008093 | 1/2010 |
| JP | 2010-256291 | 11/2010 |

* cited by examiner

DISTANCE MEASURING SYSTEM

CROSS REFERENCE TO RELATED APPLICATIONS

This application is a national stage application under 35 U.S.C. 371 and claims the benefit of PCT Application No. PCT/JP2021/003259, having an international filing date of 29 Jan. 2021, which designated the United States, which PCT application claimed the benefit of Japanese Patent Application No. 2020-055951, filed 26 Mar. 2020, the entire disclosures of each of which are incorporated herein by reference.

TECHNICAL FIELD

The technology (present technology) according to the present disclosure relates to a distance measuring system that measures a distance by, for example, direct time of flight (ToF).

BACKGROUND ART

As a distance measuring system that measures a distance to an object by direct ToF, for example, there is a distance measuring system having a configuration disclosed in Patent Document 1. The distance measuring system disclosed in Patent Document 1 combines a light source that generates measurement light and a high-speed and high-sensitivity sensor by a module, and the distance measuring system measures a distance to an object according to time when the measurement light output from the light source and reflected on the object is acquired by the sensor. Furthermore, the distance measuring system disclosed in Patent Document 1 uses one wavelength (for example, 940 [nm]) as a wavelength of the measurement light in consideration of visibility of the measurement light by humans and an influence of sunlight.

CITATION LIST

Patent Document

Patent Document 1: US 2019/0,033,433 A

SUMMARY OF THE INVENTION

Problems to be Solved by the Invention

However, in a technique disclosed in Patent Document 1, since there is only the one wavelength of the measurement light, there is a problem that for an object having a low reflectance with respect to only the one wavelength (painted object or the like), an amount of light reflected by the object is small, and the measurement accuracy of the distance decreases. Furthermore, there is a problem that the sensitivity of the sensor decreases and the measurement accuracy of a distance with respect to an object at a long distance decreases depending on the wavelength of the measurement light.

In view of the problems described above, an object of the present technology is to provide a distance measuring system capable of improving the measurement accuracy of a distance.

Solutions to Problems

A distance measuring system according to an aspect of the present technology includes a first light source and a second light source, a light source side optical member, a reference time side light receiving unit, a distance calculation side light receiving unit, a reference time calculating unit, and a distance calculating unit. The first light source and the second light source are capable of outputting light having different wavelengths. The light source side optical member changes a direction of a part of light output from each of the first light source and the second light source. Light output from one of the first light source and the second light source and changed in direction by the light source side optical member is incident on the reference time side light receiving unit. Light output from the other of the first light source and the second light source, transmitted through the light source side optical member, and reflected by an object for measuring a distance is incident on the distance calculation side light receiving unit. The reference time calculating unit calculates a reference time corresponding to an elapsed time from a time point at which at least one of the first light source and the second light source has output light to a time point at which the light has been incident on the reference time side light receiving unit. The distance calculating unit calculates a distance to the object according to an elapsed time from the time point at which at least one of the first light source and the second light source has output the light to a time point at which the light has been incident on the distance calculation side light receiving unit and the reference time calculated by the reference time calculating unit.

MODE FOR CARRYING OUT THE INVENTION

Figure 1:
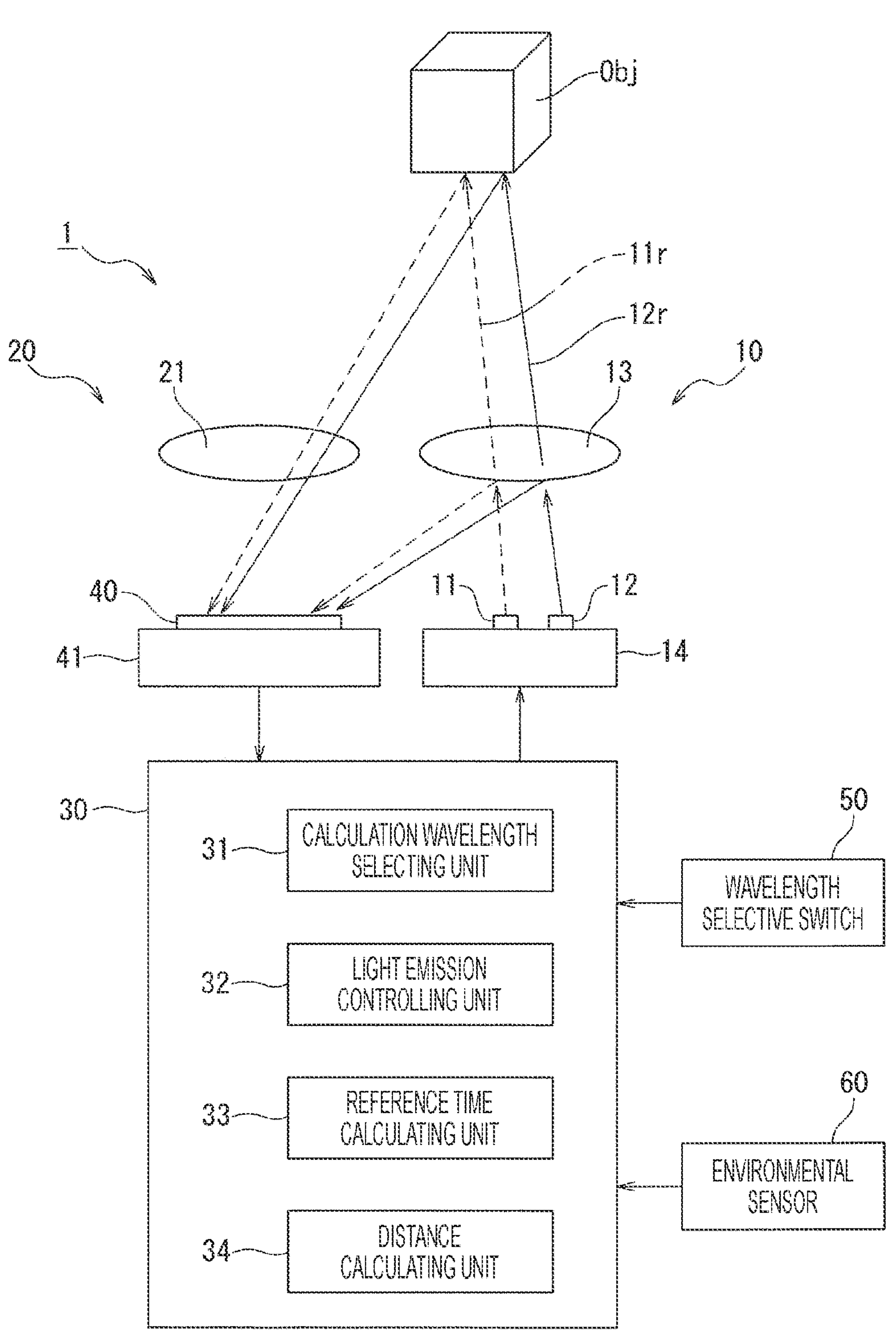
FIG. 1 is a block diagram illustrating a configuration example of a distance measuring system according to a first embodiment.

Hereinafter, embodiments of the present technology will be described with reference to the drawings. In the description of the drawings, the same or similar parts are denoted by the same or similar reference numerals, and redundant description is omitted. Each drawing is schematic and includes a case different from an actual case. The following embodiments illustrate an apparatus and a method for embodying the technical idea of the present technology, and the technical idea of the present technology is not limited to the apparatus and the method illustrated in the following embodiments. Various modifications can be made to the technical idea of the present technology within the technical scope described in the claims.

First Embodiment

<Distance Measuring System>

As illustrated in FIG. 1, a distance measuring system 1 according to a first embodiment includes a light emitting unit 10, a light receiving unit 20, and a controlling unit 30.

The distance measuring system 1 is a system for irradiating an object Obj for which a distance is to be measured with light emitted from the light emitting unit 10 and measuring a distance to the object Obj by using the light reflected by the object Obj and incident on the light receiving unit 20.

<Light Emitting Unit>

The light emitting unit 10 includes a first light source 11, a second light source 12, and a light source side optical member 13. Note that in FIG. 1, the arrangement of the first light source 11 and the second light source 12 is illustrated as a simplified arrangement.

The first light source 11 is mounted on a light emitting side substrate 14 and is formed using, for example, a vertical cavity surface emitting laser (VCSEL) light source.

Furthermore, the first light source 11 is capable of outputting first light whose wavelength is set to a predetermined wavelength.

In the first embodiment, as an example, a case where the wavelength of the first light is set to 850 [nm] will be described.

Moreover, the first light source 11 outputs the first light in synchronization with a light emission control signal input from the controlling unit 30.

Similarly to the first light source 11, the second light source 12 is mounted on the light emitting side substrate 14 and is formed using, for example, a VCSEL light source. That is, the first light source 11 and the second light source 12 are mounted on the same semiconductor substrate.

Furthermore, the second light source 12 is capable of outputting second light whose wavelength is set to a predetermined wavelength.

The wavelength of the second light is set to a wavelength at which a difference from a wavelength of the first light is 10 [nm] or more.

In the first embodiment, as an example, a case where the wavelength of the second light is set to 940 [nm] will be described.

Moreover, the second light source 12 outputs the second light in synchronization with a light emission control signal input from the controlling unit 30.

Therefore, the first light source 11 and the second light source 12 simultaneously output light having different wavelengths (first light and second light).

Figure 2:
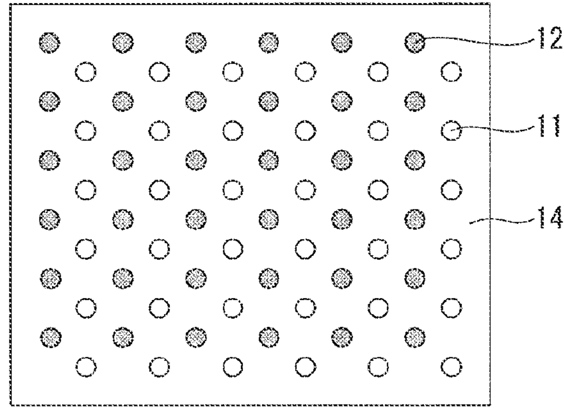
FIG. 2 is a view illustrating an arrangement of a first light source and a second light source.
Figure 3:
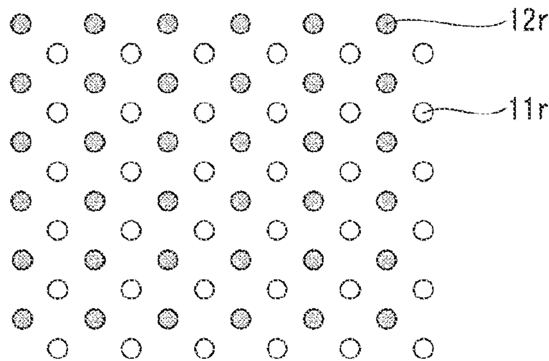
FIG. 3 is a view illustrating a projection image of light output from the first light source and the second light source onto a space.

Furthermore, as illustrated in FIG. 2, the first light sources 11 and the second light sources 12 are arranged in a nested manner. In a case where the first light sources 11 and the second light sources 12 are arranged in a nested manner, a projection image of light output from the first light source 11 and the second light source 12 onto a space is a projection image in which there are approximately the same number of distance measurement points as the number of the first light sources 11 or the second light sources 12 as illustrated in FIG. 3. Note that in FIG. 3, the light output from the first light source 11 is denoted by a reference sign "11*r*", and the light output from the second light source 12 is denoted by a reference sign "12*r*".

Note that the arrangement of the first light sources 11 and the second light sources 12 is not limited as long as the number of the first light sources 11 and the second light sources 12 satisfies output required of the distance measuring system 1.

The light source side optical member 13 is formed using, for example, a lens and reflects a part of the light output from each of the first light source 11 and the second light source 12. In addition to this, the light source side optical member 13 transmits another part of the light output from each of the first light source 11 and the second light source 12.

That is, the light source side optical member 13 changes a direction of a part of the light output from each of the first light source 11 and the second light source 12.

Note that the light source side optical member 13 is not limited to a configuration formed using a lens and for example, may be formed using a member that mechanically changes a direction of a part of the light output from the first light source 11 and the second light source 12 by driving a shutter or the like. Furthermore, the light source side optical member 13 may be formed using, for example, an optical element other than a lens, such as a filter.

<Light Receiving Unit>

The light receiving unit 20 includes a light receiving side optical member 21 and a light receiving element unit 40.

The light receiving side optical member 21 is formed using, for example, a lens and transmits light output from each of the first light source 11 and the second light source 12, transmitted through the light source side optical member 13, and incident from the outside.

Note that the light receiving side optical member 21 is not limited to a configuration formed using a lens, and may be formed using, for example, an optical element other than a lens, such as a filter.

Figure 4:
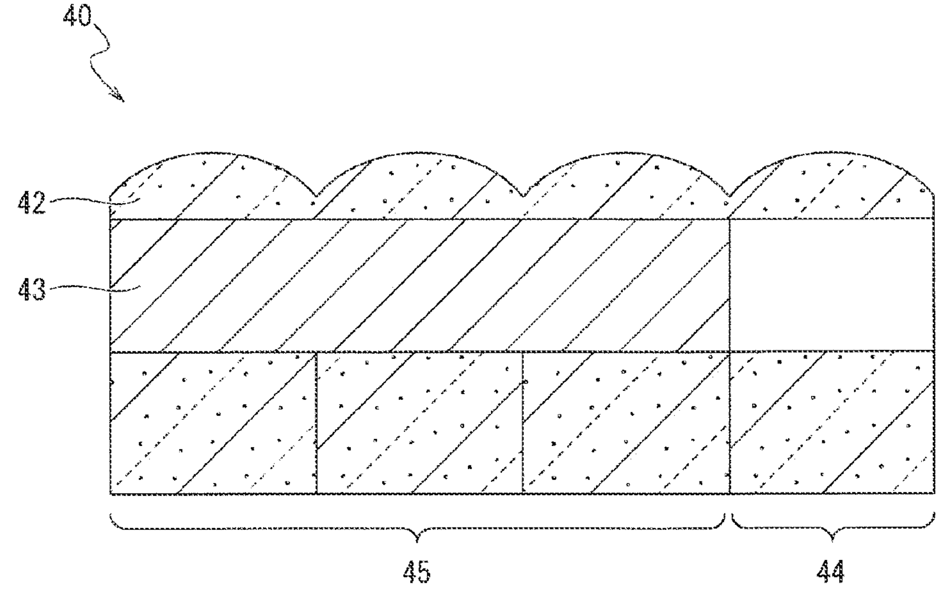
FIG. 4 is a cross-sectional view illustrating a schematic configuration of a light receiving element unit.

The light receiving element unit 40 is mounted on a light receiving side substrate 41 and includes an on-chip lens 42, a first filter unit 43, a first light receiving element 44, and a second light receiving element 45 as illustrated in FIG. 4.

The on-chip lens 42 is a lens having a function of condensing light toward the first light receiving element 44 and the second light receiving element 45. Furthermore, the on-chip lens 42 is arranged on a side where the light of the first light receiving element 44 and the second light receiving element 45 is incident. As a material of the on-chip lens 42, for example, an organic material, a silicon oxide film (SiO2), or the like can be used.

The first filter unit 43 is formed using, for example, a wavelength filter and shields one of the first light and the second light. In addition to this, the first filter unit 43 transmits the other of the first light and the second light.

In the first embodiment, as an example, a case where the first filter unit 43 is configured to shield the first light and transmit the second light will be described.

Furthermore, the first filter unit 43 is arranged in a path until the light changed in direction by the light source side optical member 13 and the light reflected by the object Obj are incident on the second light receiving element 45.

The first light receiving element 44 is formed using, for example, a single photon avalanche photodiode (SPAD).

Furthermore, the first light output from the first light source 11 and changed in direction by the light source side optical member 13 and the second light output from the second light source 12 and changed in direction by the light source side optical member 13 are incident on the first light receiving element 44. Moreover, the first light output from the first light source 11, transmitted through the light source side optical member 13, and reflected by the object Obj and the second light output from the second light source 12, transmitted through the light source side optical member 13, and reflected by the object Obj are incident on the first light receiving element 44.

Then, when the first light or the second light is incident, the first light receiving element 44 outputs, to the controlling unit 30, an information signal (that may be described as a "first incident timing signal" in the following description) including a timing at which the first light or the second light has been incident on the first light receiving element 44.

Similarly to the first light receiving element 44, the second light receiving element 45 is formed using, for example, an SPAD.

Furthermore, the first filter unit 43 that shields the first light and transmits the second light is arranged in the path until the light changed in direction by the light source side optical member 13 and the light reflected by the object Obj are incident on the second light receiving element 45.

Therefore, the second light output from the second light source 12 and changed in direction by the light source side optical member 13 is incident on the second light receiving element 45. Moreover, the second light output from the second light source 12 and transmitted through the light source side optical member 13, and reflected by the object Obj is incident on the second light receiving element 45.

Then, when the second light is incident, the second light receiving element 45 outputs, to the controlling unit 30, an information signal (that may be described as a "second incident timing signal" in the following description) including a timing at which the second light has been incident on the second light receiving element 45.

<Controlling Unit>

The controlling unit 30 includes a calculation wavelength selecting unit 31, a light emission controlling unit 32, a reference time calculating unit 33, and a distance calculating unit 34.

The calculation wavelength selecting unit 31 selects the wavelength of light used for calculating the reference time by the reference time calculating unit 33 and the wavelength of light used for calculating the distance by the distance calculating unit 34 according to the operation state of a wavelength selective switch 50 and an external environment acquired by an environmental sensor 60.

The wavelength selective switch 50 is, for example, a switch operated according to the type of the object Obj. Furthermore, the operation of the wavelength selective switch 50 may be manual or automatic.

The environmental sensor 60 is formed using, for example, an illuminance sensor or the like and acquires an environment (luminance or the like) using a configuration in which the distance measuring system 1 is mounted (vehicle, camera, or the like).

Then, for example, when a wavelength of 940 [nm] is selected as the wavelength of the light used for calculating the distance by the distance calculating unit 34 by the operation of the wavelength selective switch 50, the calculation wavelength selecting unit 31 outputs an information signal indicating the selected wavelength to the reference time calculating unit 33 and the distance calculating unit 34. Furthermore, for example, when a wavelength of 850 [nm] is selected as the wavelength of the light used for calculating the distance by the distance calculating unit 34 according to the environment acquired by the environmental sensor 60, the calculation wavelength selecting unit 31 outputs an information signal indicating the selected wavelength to the reference time calculating unit 33 and the distance calculating unit 34.

Note that a state in which the wavelength of 940 [nm] is selected is, for example, outdoors in good weather or the like. Furthermore, a state in which the wavelength of 850 [nm] is selected is, for example, nighttime, indoors, or the like.

The light emission controlling unit 32 controls irradiation timings of the first light and the second light by supplying a light emission control signal to the light emitting unit 10. The frequency of the light emission control signal is, for example, 20 [MHz]. Note that the frequency of the light emission control signal is not limited to 20 [MHz] and may be 5 [MHz] or the like. Furthermore, the light emission control signal is not limited to a rectangular wave as long as the light emission control signal is a periodic signal. For example, the light emission control signal may be a sine wave.

Furthermore, the light emission controlling unit 32 outputs the light emission control signal to the reference time calculating unit 33 and the distance calculating unit 34.

The reference time calculating unit 33 calculates the reference time according to the information signal input from the calculation wavelength selecting unit 31 and the light emission control signal input from the light emission controlling unit 32. Then, the reference time calculating unit 33 outputs the calculated reference time to the distance calculating unit 34.

The reference time is a time corresponding to an elapsed time from a time point at which at least one of the first light source 11 and the second light source 12 has output light to a time point at which the first light has been incident on the first light receiving element 44 or a time point at which the second light has been incident on the second light receiving element 45.

For example, in a case where the information signal input from the calculation wavelength selecting unit 31 is an information signal in which a wavelength of 940 [nm] is selected, the reference time calculating unit 33 selects a wavelength of 850 [nm] as the wavelength of the light used for calculating the reference time. Then, the reference time calculating unit 33 refers to the first incident timing signal, and calculates, as a reference time, a time corresponding to an elapsed time from a time point at which the first light source 11 and the second light source 12 have output light to a time point at which the first light has been incident on the first light receiving element 44.

Furthermore, in a case where the information signal input from the calculation wavelength selecting unit 31 is an information signal in which a wavelength of 850 [nm] is selected, the reference time calculating unit 33 selects a wavelength of 940 [nm] as the wavelength of the light used for calculating the reference time. Then, the reference time calculating unit 33 refers to the second incident timing signal, and calculates, as a reference time, a time corresponding to an elapsed time from a time point at which the first light source 11 and the second light source 12 have output light to a time point at which the second light has been incident on the second light receiving element 45.

That is, the reference time calculating unit 33 calculates, as the reference time, the shortest time of an elapsed time from a time point at which at least one of the first light source 11 and the second light source 12 has output light to a time point at which the light has been incident on the first light receiving element 44 or the second light receiving element 45.

The distance calculating unit 34 calculates a distance to the object Obj according to the information signal input from the calculation wavelength selecting unit 31, the light emission control signal input from the light emission controlling unit 32, and the reference time calculated by the reference time calculating unit 33.

Specifically, the distance calculating unit 34 calculates the distance to the object Obj according to an elapsed time from a time point at which at least one of the first light source 11 and the second light source 12 has output light to a time point at which the first light has been incident on the first light receiving element 44 or an elapsed time from the time point at which at least one of the first light source 11 and the second light source 12 has output light to a time point at which the second light has been incident on the second light receiving element 45 and the reference time calculated by the reference time calculating unit 33.

For example, in a case where the information signal input from the calculation wavelength selecting unit 31 is the information signal in which a wavelength of 940 [nm] is selected, the distance calculating unit 34 refers to the second incident timing signal and calculates a time difference between an elapsed time from a time point at which the first light source 11 and the second light source 12 have output light to a time point at which the second light has been incident on the second light receiving element 45 and the reference time. Then, for example, in a case where a configuration in which the distance measuring system 1 is mounted is a vehicle, the distance calculating unit 34 calculates the distance to the object Obj according to the calculated time difference, a moving speed of the vehicle, and the like.

Furthermore, in a case where the information signal input from the calculation wavelength selecting unit 31 is the information signal in which a wavelength of 850 [nm] is selected, the distance calculating unit 34 refers to the first incident timing signal and calculates a time difference between a time of an elapsed time that is longer than the reference time and the reference time, the elapsed time being from a time point at which the first light source 11 and the second light source 12 have output light to a time point at which the light has been incident on the first light receiving element 44. Then, for example, in a case where a configuration in which the distance measuring system 1 is mounted is a vehicle, the distance calculating unit 34 calculates the distance to the object Obj according to the calculated time difference, a moving speed of the vehicle, and the like.

That is, the distance calculating unit 34 calculates the distance to the object Obj according to a time difference between a time of an elapsed time that is longer than the reference time and the reference time, the elapsed time being from a time point at which at least one of the first light source 11 and the second light source 12 has output light to a time point at which the light has been incident on the first light receiving element 44 or the second light receiving element 45.

<Correspondence with Claims>

In the first embodiment, when the wavelength of 940 [nm] is selected as the wavelength of the light used for calculating the distance by the distance calculating unit 34, the first light receiving element 44 corresponds to the reference time side light receiving unit, and the second light receiving element 45 corresponds to the distance calculation side light receiving unit. Furthermore, in the first embodiment, when the wavelength of 940 [nm] is selected as the wavelength of the light used for calculating the distance by the distance calculating unit 34, the light output from the first light source 11 corresponds to reference light used for calculating the reference time, and the light output from the second light source 12 corresponds to distance measuring light with which the object Obj is irradiated.

Furthermore, in the first embodiment, when the wavelength of 850 [nm] is selected as the wavelength of the light used for calculating the distance by the distance calculating unit 34, the first light receiving element 44 corresponds to the distance calculation side light receiving unit, and the second light receiving element 45 corresponds to the reference time side light receiving unit. Furthermore, in the first embodiment, when the wavelength of 850 [nm] is selected as the wavelength of the light used for calculating the distance by the distance calculating unit 34, the light output from the first light source 11 corresponds to the distance measuring light with which the object Obj is irradiated, and the light output from the second light source 12 corresponds to the reference light used for calculating the reference time.

<Operations and Effects of First Embodiment>

The distance measuring system 1 of the first embodiment can achieve the following operations and effects.

(1) The distance measuring system 1 includes the first light source 11 and the second light source 12 that are capable of outputting light having different wavelengths and the light source side optical member 13 that changes a direction of a part of light output from each of the first light source 11 and the second light source 12. Moreover, the distance measuring system 1 includes the reference time side light receiving unit on which light output by one of the first light source 11 and the second light source 12 and changed in direction by the light source side optical member 13 is incident and the distance calculation side light receiving unit on which light output by the other of the first light source 11 and the second light source 12, transmitted through the light source side optical member 13, and reflected by the object Obj is incident. In addition to this, the distance measuring system 1 includes the reference time calculating unit 33 that calculates a reference time and the distance calculating unit 34 that calculates a distance to the object Obj.

With this configuration, it is possible to calculate the distance to the object Obj using two light beams having different wavelengths, and it is possible to provide the distance measuring system 1 capable of improving the measurement accuracy of the distance with respect to the object Obj having a low reflectance for only one wavelength.

(2) The distance measuring system 1 includes the first filter unit 43 that shields one of the light output from the first light source 11 and the light output from the second light source 12 and transmits the other of the light output from the first light source 11 and the light output from the second light source 12. In addition to this, the first filter unit 43 is arranged in a path until the light changed in direction by the light source side optical member 13 and the light reflected by the object Obj are incident on the distance calculation side light receiving unit.

With this configuration, it is possible to physically select light to be incident on the distance calculation side light receiving unit without requiring calculation and the like.

(3) A difference between the wavelength of the light output from the first light source 11 and the wavelength of the light output from the second light source 12 is 10 [nm] or more.

As a result, it is possible to improve the measurement accuracy of the distance with respect to the object Obj having a different reflectance for a wavelength.

(4) The first light source 11 and the second light source 12 simultaneously output light having different wavelengths.

As a result, for example, it is possible to improve the intensity of the light output from the first light source 11 and the second light source 12 in the distance measuring system 1 used under a managed environment such as in an industrial application, and thus, it is possible to improve the measurement accuracy of the distance.

(5) The first light source 11 and the second light source 12 are mounted on the same semiconductor substrate (light emitting side substrate 14).

With this configuration, the light emitting unit 10 can be made compact, and the distance measuring system 1 can be made compact.

(6) When a high wavelength of two wavelengths is selected as the wavelength of the light used for calculating the distance by the distance calculating unit 34, the light output from the first light source 11 is the reference light used for the calculating the reference time, and the light output from the second light source 12 is the distance measuring light with which the object Obj is irradiated.

As a result, it is possible to selectively use the light output from the first light source 11 and the light output from the second light source 12 according to the reflectance of the object Obj, and it is possible to improve the measurement accuracy of the distance.

(7) When a low wavelength of the two wavelengths is selected as the wavelength of the light used for calculating the distance by the distance calculating unit 34, the light output from the first light source 11 is the distance measuring light to be emitted to the object Obj, and the light output from the second light source 12 is the reference light used for calculating the reference time.

As a result, it is possible to selectively use the light output from the first light source 11 and the light output from the second light source 12 according to the reflectance of the object Obj, and it is possible to improve the measurement accuracy of the distance.

(8) The distance measuring system 1 includes the calculation wavelength selecting unit 31 that selects a wavelength of light used for calculating the reference time by the reference time calculating unit 33 and a wavelength of light used for calculating the distance by the distance calculating unit 34.

With this configuration, it is possible to select the wavelength of the light used for calculating the reference time by the reference time calculating unit 33 and the wavelength of the light used for calculating the distance by the distance calculating unit 34 according to the reflectance of the object Obj, and it is possible to improve the measurement accuracy of the distance.

Modification of First Embodiment (1) In the first embodiment, the first light source 11 and the second light source 12 are configured to simultaneously output light having different wavelengths. However, the present technology is not limited thereto, and a first light source 11 and a second light source 12 may be configured to output light having different wavelengths in a time division manner.

In this case, for example, it is possible to reduce power consumption and improve the safety of a use environment.

Figure 5:
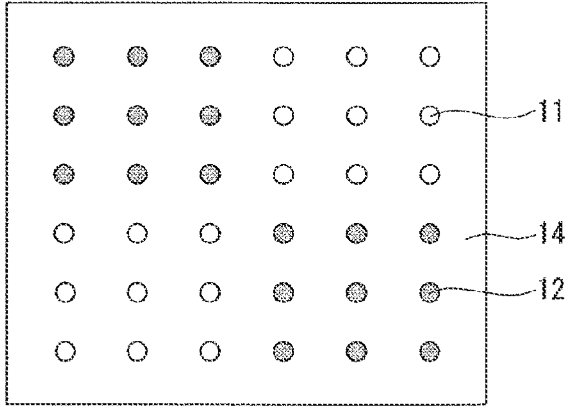
FIG. 5 is a view illustrating a modification of the first embodiment.
Figure 6:
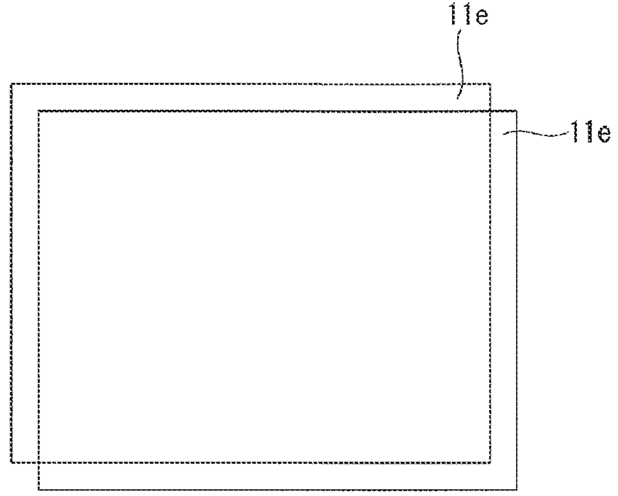
FIG. 6 is a view illustrating a modification of the first embodiment.

(2) In the first embodiment, the first light sources 11 and the second light sources 12 are arranged in a nested manner, but the present technology is not limited thereto. That is, for example, as illustrated in FIG. 5, a group in which a plurality of first light sources 11 is arranged in a grid shape and a group in which a plurality of second light sources 12 is arranged in a grid shape may be uniformly arranged. In this case, for example, light output from the first light source 11 and the second light source 12 is scattered by disposing an external diffuser or the like outside a light source side optical member 13, so that a projection image of the light output from the first light source 11 and the second light source 12 onto a space is a projection image in which a region where the light output from the first light source 11 is diffused and a region where the light output from the second light source 12 is diffused overlap with each other as illustrated in FIG. 6. Note that in FIG. 6, the region where the light output from the first light source 11 is diffused is denoted by a reference sign "11*e*", and the region where the light output from the second light source 12 is diffused is denoted by a reference sign "12*e*".

Figure 7:
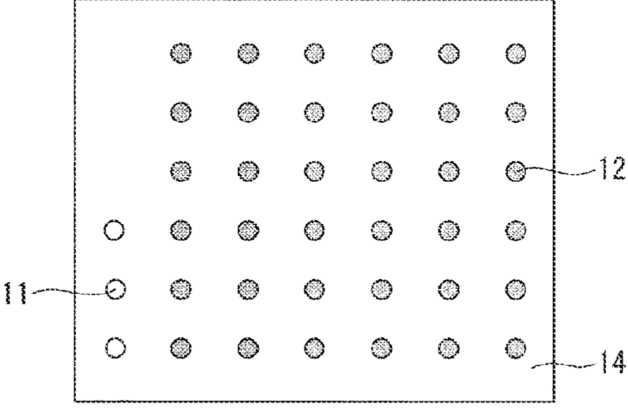
FIG. 7 is a view illustrating a modification of the first embodiment.
Figure 8:
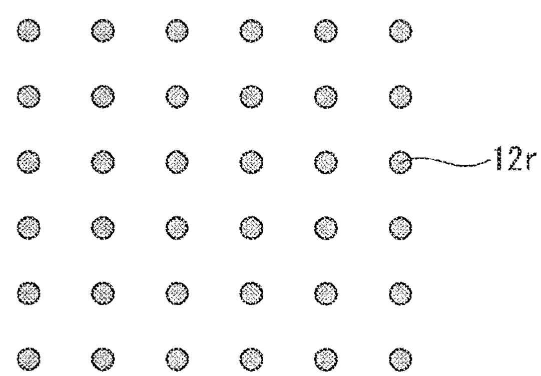
FIG. 8 is a view illustrating a modification of the first embodiment.

(3) In the first embodiment, as illustrated in FIG. 2, the number of the first light sources 11 is equal to the number of the second light sources 12, and the first light sources 11 and the second light sources 12 are arranged in a nested manner, but the present technology is not limited thereto. That is, for example, in a case where light output from the first light source 11 is limited to reference light and light output from the second light source 12 is limited to distance measuring light, as illustrated in FIG. 7, the first light sources 11 may be arranged on a side of a light emitting side substrate 14 close to a light receiving unit 20, and a plurality of second light sources 12 may be arranged in a grid shape. This is because required performance is satisfied when the reference light output from the first light source 11 is changed in direction by the light source side optical member 13 and is incident on the light receiving unit 20. In this case, a projection image of the light output from the first light source 11 and the second light source 12 onto the space is a projection image in which there are approximately the same number of distance measurement points as the number of the second light sources 12 as illustrated in FIG. 8.

(4) In the first embodiment, the wavelength of the first light is set to 850 [nm], and the wavelength of second light is set to 940 [nm], but the present technology is not limited thereto. That is, the wavelength of first light and the wavelength of second light may be set to, for example, 810 [nm] or within a range of 1400 [nm] to 1550 [nm] that are wavelengths in a short-wavelength infrared band.

Second Embodiment

Hereinafter, a distance measuring system 1 will be described with reference to the drawings. Note that in the following description, description of parts common to those in the first embodiment may be omitted.

Figure 9:
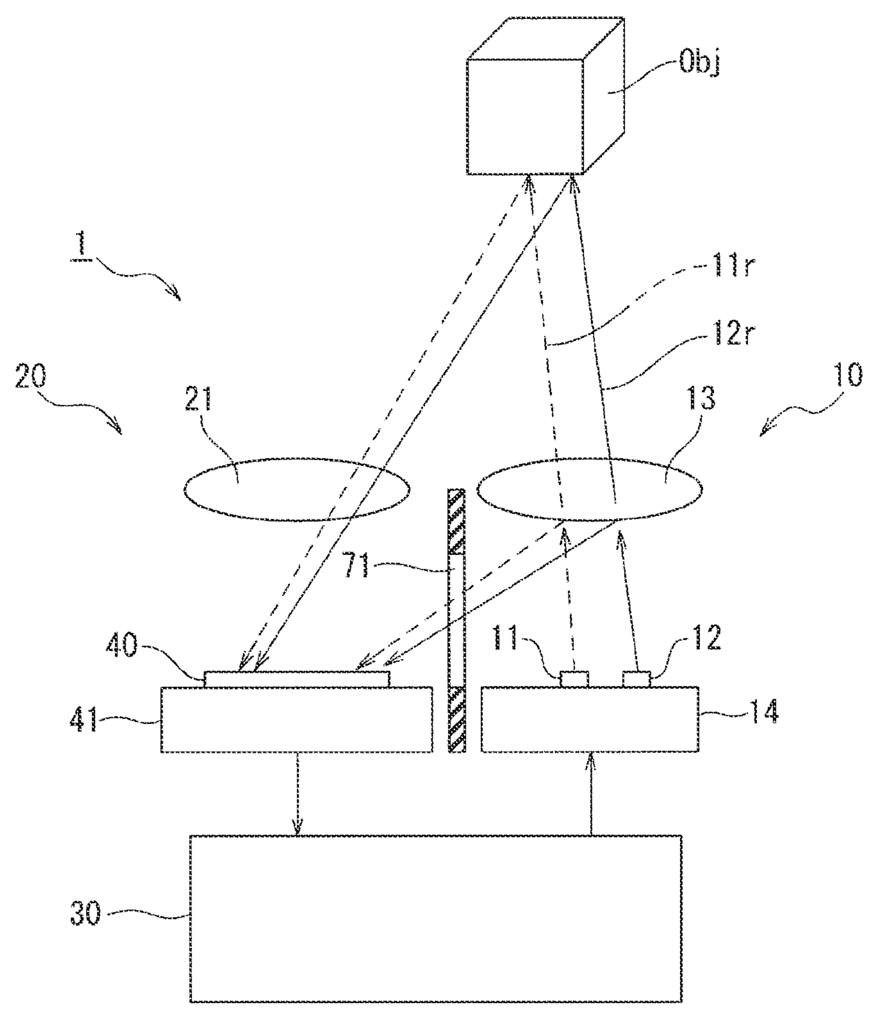
FIG. 9 is a block diagram illustrating a configuration example of a distance measuring system according to a second embodiment.

As illustrated in FIG. 9, a distance measuring system 1 according to a second embodiment includes a light emitting unit 10, a light receiving unit 20, a controlling unit 30, and a light shielding wall 70. Note that description of the light emitting unit 10, the light receiving unit 20, and the controlling unit 30 will be omitted.

<Light Shielding Wall>

The light shielding wall 70 is arranged between a light emitting side substrate 14 on which the first light source 11 and the second light source 12 are mounted and a light receiving side substrate 41 on which a reference time side light receiving unit and a distance calculation side light receiving unit are mounted, and a second filter unit 71 is formed.

The second filter unit 71 is formed using, for example, a band-pass filter and is arranged between a light source side optical member 13 and the reference time side light receiving unit and the distance calculation side light receiving unit.

Furthermore, the second filter unit 71 shields one of light output from the first light source 11 and light output from the second light source 12. In addition to this, the second filter unit 71 transmits the other of the light output from the first light source 11 and the light output from the second light source 12.

In the second embodiment, as an example, a case where the second filter unit 71 is configured to shield second light and transmit first light will be described.

<Operations and Effects of Second Embodiment>

The distance measuring system 1 of the second embodiment can achieve the following operations and effects.

(1) The distance measuring system 1 includes the second filter unit 71 that shields one of the light output from the first light source 11 and the light output from the second light source 12 and transmits the other of the light output from the first light source 11 and the light output from the second light source 12. In addition to this, the second filter unit 71 is arranged between the light source side optical member 13 and the reference time side light receiving unit and the distance calculation side light receiving unit.

With this configuration, it is possible to physically select light to be incident on the reference time side light receiving unit without requiring calculation and the like.

(2) The second filter unit 71 is formed in the light shielding wall 70 arranged between the light emitting side substrate 14 on which the first light source 11 and the second light source 12 are mounted and the light receiving side substrate 41 on which the reference time side light receiving unit and the distance calculation side light receiving unit are mounted.

With this configuration, it is possible to cause light used for calculating reference time to be incident on the light receiving unit 20 without forming a wall on the light emitting side substrate 14 and the light receiving side substrate 41, and thus, it is possible to suppress an increase in a cost without increasing the area of a chip (the area of a semiconductor substrate).

Third Embodiment

Hereinafter, a distance measuring system 1 will be described with reference to the drawings. Note that in the following description, description of parts common to those in the first embodiment and the second embodiment may be omitted.

A distance measuring system 1 according to a third embodiment includes a light emitting unit 10, a light receiving unit 20, a controlling unit 30, and a light shielding wall 70 (see FIG. 9). Note that description of the light shielding wall 70 is omitted.

<Light Emitting Unit>

The light emitting unit 10 includes a first light source 11, a second light source 12, and a light source side optical member 13 (see FIG. 1).

The light emitting unit 10 included in the distance measuring system 1 according to the third embodiment is configured to be capable of selecting a wavelength of light to be output by the second light source 12, unlike the first embodiment and the second embodiment described above.

In the third embodiment, as an example, a case where the second light source 12 is configured to be capable of selecting and outputting second light and third light will be described. Furthermore, in the third embodiment, as an example, a case where the wavelength of the second light is set to 940 [nm] and the wavelength of the third light is set to 1400 [nm] will be described.

<Light Receiving Unit>

The light receiving unit 20 includes a light receiving side optical member 21 and a light receiving element unit 40 (see FIG. 1).

The configuration of the light receiving side optical member 21 is similar to those in the first embodiment and the second embodiment.

Figure 10:
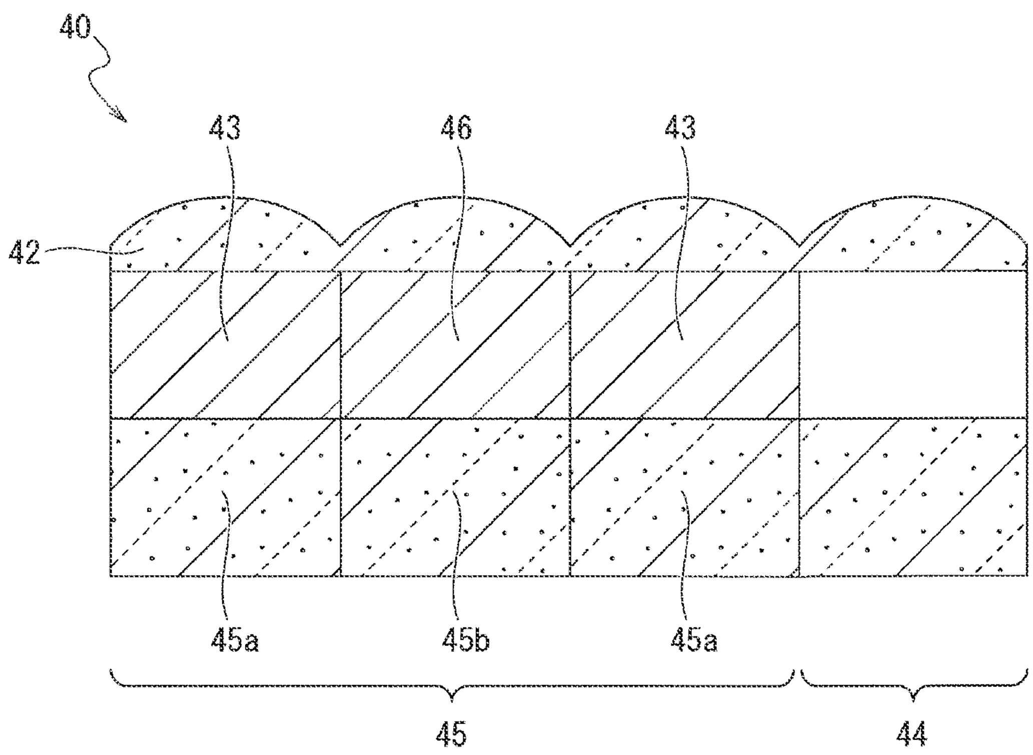
FIG. 10 is a cross-sectional view illustrating a schematic configuration of a light receiving element unit included in a distance measuring system according to a third embodiment.

The light receiving element unit 40 is mounted on a light receiving side substrate 41 and includes an on-chip lens 42, a first filter unit 43, a third filter unit 46, a first light receiving element 44, and a second light receiving element 45 as illustrated in FIG. 10.

The configuration of the on-chip lens 42 is similar to those in the first embodiment and the second embodiment.

The first filter unit 43 is formed using, for example, a wavelength filter and shields one of the first light, the second light, and the third light. In addition to this, the first filter unit 43 transmits two of the first light, the second light, and the third light.

In the third embodiment, as an example, a case where the first filter unit 43 is configured to shield the first light and transmit the second light and the third light will be described.

Furthermore, the first filter unit 43 is arranged in a path until the light changed in direction by the light source side optical member 13 and the light reflected by the object Obj are incident on the second light receiving element 45. Moreover, the first filter unit 43 is arranged at a position covering a selected region of the second light receiving element 45.

The third filter unit 46 is formed using, for example, a wavelength filter and shields light output from the first light source 11 and light having a part of wavelengths selectable by the second light source 12. In addition to this, the third filter unit 46 transmits light having another part of the wavelengths selectable by the second light source 12.

In the third embodiment, as an example, a case where the third filter unit 46 is configured to shield the first light and the second light and transmit the third light will be described.

Furthermore, the third filter unit 46 is arranged in the path until changed in direction by the light source side optical member 13 and the light reflected by an object Obj are incident on the second light receiving element 45. Moreover, the third filter unit 46 is arranged at a position covering a selected region of the second light receiving element 45 that is different from the first filter unit 43.

The configuration of the first light receiving element 44 is similar to those in the first embodiment and the second embodiment.

Similarly to the first light receiving element 44, the second light receiving element 45 is formed using, for example, an SPAD.

Furthermore, a plurality of pixels included in the second light receiving element 45 includes a second light receiving region 45*a* that is a region that receives only the second light and a third light receiving region 45*b* that is a region that receives only the third light. The first filter unit 43 is arranged in the second light receiving region 45*a*, and the third filter unit 46 is arranged in the third light receiving region 45*b*.

Furthermore, the first filter unit 43 that shields the first light and transmits the second light and the third light is arranged in the path until the light changed in direction by the light source side optical member 13 and the light reflected by the object Obj are incident on the second light receiving element 45. In addition to this, the third filter unit 46 that shields the first light and the second light and transmits the third light is arranged in the path until the light changed in direction by the light source side optical member 13 and the light reflected by the object Obj are incident on the second light receiving element 45.

Therefore, the second light output from the second light source 12, transmitted through the light source side optical member 13, and reflected by the object Obj is incident on the second light receiving region 45*a* of the second light receiving element 45. Moreover, the third light output from the second light source 12, transmitted through the light source side optical member 13, and reflected by the object Obj is incident on the third light receiving region 45*b* of the second light receiving element 45.

Then, when the second light is incident on the second light receiving region 45*a*, the second light receiving element 45 outputs a second incident timing signal to the controlling unit 30. In addition to this, when the third light is incident on the third light receiving region 45*b*, the second light receiving element 45 outputs, to the controlling unit 30, an information signal (may be described as a "third incident timing signal" in the following description) including a timing at which the third light has been incident on the third light receiving region 45*b*.

<Controlling Unit>

The controlling unit 30 includes a calculation wavelength selecting unit 31, a light emission controlling unit 32, a reference time calculating unit 33, and a distance calculating unit 34 (see FIG. 1). In addition to this, although not illustrated, the controlling unit 30 includes an output wavelength selecting unit that selects a wavelength of light to be output from the wavelengths selectable by the second light source 12.

The configuration of the calculation wavelength selecting unit 31 is similar to those in the first embodiment and the second embodiment.

The light emission controlling unit 32 controls irradiation timings of the first light and the second light or an irradiation timing of the third light by supplying a light emission control signal to the light emitting unit 10.

The configuration of the reference time calculating unit 33 is similar to those in the first embodiment and the second embodiment.

The distance calculating unit 34 calculates a distance to the object Obj according to the information signal input from the calculation wavelength selecting unit 31, the light emission control signal input from the light emission controlling unit 32, and a reference time calculated by the reference time calculating unit 33.

Specifically, the distance calculating unit 34 calculates the distance to the object Obj according to an elapsed time from a time point at which at least one of the first light source 11 and the second light source 12 has output light to a time point at which the first light has been incident on the first light receiving element 44 or an elapsed time from the time point at which at least one of the first light source 11 and the second light source 12 has output light to a time point at which the second light or the third light has been incident on the second light receiving element 45 and the reference time calculated by the reference time calculating unit 33.

For example, in a case where the information signal input from the calculation wavelength selecting unit 31 is the information signal in which a wavelength of 940 [nm] is selected, the distance calculating unit 34 refers to the second incident timing signal and calculates a time difference between an elapsed time from a time point at which the first light source 11 and the second light source 12 have output light to a time point at which the second light has been incident on the second light receiving element 45 and the reference time. Then, for example, in a case where a configuration in which the distance measuring system 1 is mounted is a vehicle, the distance calculating unit 34 calculates the distance to the object Obj according to the calculated time difference, a moving speed of the vehicle, and the like.

Furthermore, for example, in a case where the information signal input from the calculation wavelength selecting unit 31 is an information signal in which a wavelength of 1400 [nm] is selected, the distance calculating unit 34 refers to the third incident timing signal and calculates a time difference between an elapsed time from a time point at which the first light source 11 and the second light source 12 have output light to a time point at which the third light has been incident on the second light receiving element 45 and the reference time. Then, for example, in a case where a configuration in which the distance measuring system 1 is mounted is a vehicle, the distance calculating unit 34 calculates the distance to the object Obj according to the calculated time difference, a moving speed of the vehicle, and the like.

The output wavelength selecting unit selects a wavelength of light to be output from the wavelengths selectable by the second light source 12 according to the operation state of a wavelength selective switch 50 and an external environment acquired by an environmental sensor 60.

<Operations and Effects of Third Embodiment>

The distance measuring system 1 of the third embodiment can achieve the following operations and effects.

(1) One of the first light source 11 and the second light source 12 is capable of selecting a wavelength of light to be output.

With this configuration, for example, even in a case where the object Obj has a low reflectance for one wavelength of the selectable wavelengths, it is possible to irradiate the object Obj with another wavelength of the selectable wavelengths. Therefore, it is possible to improve the measurement accuracy of the distance with respect to the object Obj having a different reflectance for a wavelength.

(2) The distance measuring system 1 includes an output wavelength selecting unit that selects a wavelength of light to be output from the selectable wavelengths.

With this configuration, it is possible to select a wavelength of light used for measuring the distance with respect to the object Obj having a different reflectance for a wavelength, and it is possible to improve the measurement accuracy of the distance.

(3) The distance measuring system 1 includes the third filter unit 46 that shields one of light output from the first light source 11 and light output from the second light source 12 and light having a part of the selectable wavelengths and transmits light having another part of the selectable wavelengths. In addition to this, the third filter unit 46 is arranged in a path until the light changed in direction by the light source side optical member 13 and the light reflected by the object are incident on a distance calculation side light receiving unit.

With this configuration, it is possible to physically select light to be incident on the distance calculation side light receiving unit without requiring calculation and the like.

Furthermore, background light resistance can be improved by setting a light receiving wavelength for each of a plurality of pixels included in the second light receiving element 45.

<Modification of Third Embodiment>

(1) In the third embodiment, one of the first light source 11 and the second light source 12 is configured to be capable of selecting a wavelength of light to be output, but the present technology is not limited thereto. That is, one of a first light source 11 and a second light source 12 may be configured to be capable of simultaneously outputting a plurality of light beams having different wavelengths.

In this case, for example, it is possible to improve the intensity of light output from a light source capable of selecting a wavelength of light output out of the first light source 11 and the second light source 12 in a distance measuring system 1 used under a managed environment such as in an industrial application. As a result, it is possible to improve the measurement accuracy of a distance.

Furthermore, one of a first light source 11 and a second light source 12 may be configured to be capable of simultaneously outputting a plurality of light beams having different wavelengths in a time division manner.

In this case, for example, it is possible to reduce power consumption and improve the safety of a use environment.

(2) In the third embodiment, the light receiving element unit 40 includes the on-chip lens 42, the first filter unit 43, the third filter unit 46, the first light receiving element 44, and the second light receiving element 45, but the present technology is not limited thereto. That is, a light receiving element unit 40 may be without a third filter unit 46.

In this case, the configuration of the light receiving element unit 40 can be simplified.

Other Embodiments

As described above, embodiments of the present technology have been described, but it should not be understood that the description and drawings constituting a part of this disclosure limit the present technology. Various alternative embodiments, examples, and operation techniques will be apparent to those skilled in the art from this disclosure.

In addition, it is a matter of course that the present technology includes various embodiments and the like not described herein, such as a configuration to which each configuration described in the embodiments described above is optionally applied. Therefore, the technical scope of the present technology is defined only by the matters specifying the invention according to the claims appropriate from the above description.

Furthermore, the distance measuring system of the present disclosure does not need to include all the respective components described in the embodiments described above and the like and conversely, may include other components.

Note that effects described in the present description are merely exemplary and not limited, and there may be other effects.

Note that the present technology can have the following configurations.

(1) A distance measuring system including:

a first light source and a second light source capable of outputting light having different wavelengths;

a light source side optical member configured to change a direction of a part of light output from each of the first light source and the second light source;

a reference time side light receiving unit on which light output by one of the first light source and the second light source, and changed in direction by the light source side optical member is incident;

a distance calculation side light receiving unit on which light output by another of the first light source and the second light source, transmitted through the light source side optical member, and reflected by an object for measuring a distance is incident;

a reference time calculating unit configured to calculate a reference time according to an elapsed time from a time point at which at least one of the first light source and the second light source has output light to a time point at which the light has been incident on the reference time side light receiving unit; and a distance calculating unit configured to calculate a distance to the object according to an elapsed time from the time point at which at least one of the first light source and the second light source has output light to a time point at which the light has been incident on the distance calculation side light receiving unit and the reference time calculated by the reference time calculating unit.

(2) The distance measuring system according to the (1), further including a first filter unit configured to shield one of the light output from the first light source and the light output from the second light source and transmit another of the light output from the first light source and the light output from the second light source, in which the first filter unit is arranged on a path until the light changed in direction by the light source side optical member and the light reflected by the object are incident on the distance calculation side light receiving unit.

(3) The distance measuring system according to the (1) or (2), further including a second filter unit configured to shield one of the light output from the first light source and the light output from the second light source and transmit another of the light output from the first light source and the light output from the second light source, in which the second filter unit is arranged between the light source side optical member and the reference time side light receiving unit and the distance calculation side light receiving unit.

(4) The distance measuring system according to the (3), in which the second filter unit is formed in a light shielding wall arranged between a light emitting side substrate on which the first light source and the second light source are mounted and a light receiving side substrate on which the reference time side light receiving unit and the distance calculation side light receiving unit are mounted.

(5) The distance measuring system according to any one of the (1) to (4), in which a difference between a wavelength of the light output from the first light source and a wavelength of the light output from the second light source is 10 nm or more.

(6) The distance measuring system according to any one of the (1) to (5), in which one of the first light source and the second light source is capable of selecting a wavelength of light to be output.

(7) The distance measuring system according to the (6), further including an output wavelength selecting unit configured to select a wavelength of the light to be output from the selectable wavelengths.

(8) The distance measuring system according to any one of the (1) to (7), further including a third filter unit configured to shield one of the light output from the first light source and the light output from the second light source and light having a part of the selectable wavelengths, and transmit light having another part of the selectable wavelengths, in which the third filter unit is arranged on a path until the light changed in direction by the light source side optical member and the light reflected by the object are incident on the distance calculation side light receiving unit.

(9) The distance measuring system according to any one of the (1) to (8), in which one of the first light source and the second light source is capable of simultaneously outputting a plurality of light beams having different wavelengths.

(10) The distance measuring system according to the (9), further including an output wavelength selecting unit configured to select each of wavelengths of the plurality of light beams.

(11) The distance measuring system according to the (9) or (10), further including a third filter unit configured to shield one of the light output from the first light source and the light output from the second light source and a part of the plurality of light beams having different wavelengths, and transmit another part of the plurality of light beams having different wavelengths, in which the third filter unit is arranged on a path until light changed in direction by the light source side optical member and light reflected by the object are incident on the distance calculation side light receiving unit.

(12) The distance measuring system according to any one of the (1) to (8), in which one of the first light source and the second light source is capable of outputting a plurality of light beams having different wavelengths in a time division manner.

(13) The distance measuring system according to the (12), further including an output wavelength selecting unit configured to select each of wavelengths of the plurality of light beams.

(14) The distance measuring system according to the (12) or (13), further including a third filter unit configured to shield one of the light output from the first light source and the light output from the second light source and a part of the plurality of light beams having different wavelengths and transmit another part of the plurality of light beams having different wavelengths, in which the third filter unit is arranged on the path until light changed in direction by the light source side optical member and light reflected by the object are incident on the distance calculation side light receiving unit.

(15) The distance measuring system according to any one of the (1) to (14), in which the first light source and the second light source are configured to simultaneously output the light having different wavelengths.

(16) The distance measuring system according to any one of the (1) to (14), in which the first light source and the second light source are configured to output the light having different wavelengths in a time division manner.

(17) The distance measuring system according to any one of the (1) to (16), in which the first light source and the second light source are mounted on the same semiconductor substrate.

(18) The distance measuring system according to any one of the (1) to (17), in which the light output from the first light source is reference light used for calculating the reference time, and the light output from the second light source is distance measuring light emitted to the object.

(19) The distance measuring system according to any one of the (1) to (17), in which the light output from the first light source is distance measuring light to be emitted to the object, and the light output from the second light source is reference light used for calculating the reference time.

(20) The distance measuring system according to any one of the (1) to (19), further including a calculation wavelength selecting unit configured to select a wavelength of light used for calculating the reference time by the reference time calculating unit and a wavelength of light used for calculating the distance by the distance calculating unit.

REFERENCE SIGNS LIST

1 Distance measuring system
10 Light emitting unit
11 First light source
11*r* Light output from first light source 11
11*e* Region in which light output from first light source 11 is diffused
12 Second light source
12*r* Light output from second light source 12
12*e* Region in which light output from second light source 12 is diffused
13 Light source side optical member
14 Light emitting side substrate
20 Light receiving unit
21 Light receiving side optical member
30 Controlling unit
31 Calculation wavelength selecting unit
32 Light emission controlling unit
33 Reference time calculating unit
34 Distance calculating unit
40 Light receiving element unit
41 Light receiving side substrate
42 On-chip lens
43 First filter unit
44 First light receiving element
45 Second light receiving element
45*a* Second light receiving region
45*b* Third light receiving region
46 Third filter unit
50 Wavelength selective switch
60 Environmental sensor
70 Light shielding wall
71 Second filter unit
Obj Object

The invention claimed is:

1. A distance measuring system comprising:

a first light source and a second light source capable of outputting light having different wavelengths, wherein the first light source is disposed on a first surface of a first substrate;

a light source side optical member configured to change a direction of a part of light output from each of the first light source and the second light source, wherein the second light source is disposed on the first surface of the first substrate;

a reference time side light receiving unit on which light output by at least a first one of the first light source and the second light source, and changed in direction by the light source side optical member is incident;

a distance calculation side light receiving unit on which light output by at least a second one of the first light source and the second light source, transmitted through the light source side optical member, and reflected by an object for measuring a distance is incident;

a reference time calculating unit configured to calculate a reference time according to an elapsed time from a time point at which the at least a first one of the first light source and the second light source has output light to a time point at which the light is incident on the reference time side light receiving unit; and a distance calculating unit configured to calculate a distance to the object according to an elapsed time from the time point at which at least one of the first light source and the second light source has output light to a time point at which the light is incident on the distance calculation side light receiving unit and the reference time calculated by the reference time calculating unit, wherein the reference time side light receiving unit includes a first light receiving element disposed on a first surface of a second substrate, and wherein the distance calculation side light receiving unit includes a second light receiving element disposed on the surface of the second substrate; and a first filter unit disposed on a light incident side of the distance calculation side light receiving unit, wherein the first filter unit configured to shield one of the light output from the first light source and the light output from the second light source and to transmit another of the light output from the first light source and the light output from the second light source.

2. The distance measuring system according to claim 1, further comprising a second filter unit configured to shield one of the light output from the first light source and the light output from the second light source and transmit another of the light output from the first light source and the light output from the second light source, wherein the second filter unit is arranged between the light source side optical member and the reference time side light receiving unit and the distance calculation side light receiving unit.

3. The distance measuring system according to claim 2, wherein the second filter unit is formed in a light shielding wall arranged between the first substrate on which the first light source and the second light source are mounted and the second substrate on which the reference time side light receiving unit and the distance calculation side light receiving unit are mounted.

4. The distance measuring system according to claim 1, wherein a difference between a wavelength of the light output from the first light source and a wavelength of the light output from the second light source is 10 nm or more.

5. The distance measuring system according to claim 1, further comprising:

a controlling unit, wherein the controlling unit selects a wavelength of light to be output from one of the first light source and the second light source.

6. The distance measuring system according to claim 5, wherein the controlling unit includes an output wavelength selecting unit configured to select a wavelength of the light to be output from the one of the first light source and the second light source.

7. The distance measuring system according to claim 5, a third filter unit configured to shield one of the light output from the first light source and the light output from the second light source and light having a part of the selectable wavelengths, and transmit light having another part of the selectable wavelengths, wherein the first filter is arranged on a light incident side of a first region of the distance calculation side light receiving unit, and wherein the third filter unit is arranged on a light incident side of a second region of the distance calculation side light receiving unit.

8. The distance measuring system according to claim 1, wherein one of the first light source and the second light source is capable of simultaneously outputting a plurality of light beams having different wavelengths.

9. The distance measuring system according to claim 8, further comprising an output wavelength selecting unit configured to select each of wavelengths of the plurality of light beams.

10. The distance measuring system according to claim 8, further comprising a third filter unit configured to shield one of the light output from the first light source and the light output from the second light source and a part of the plurality of light beams having different wavelengths, and transmit another part of the plurality of light beams having different wavelengths, wherein the first filter is arranged on a light incident side of a first region of the distance calculation side light receiving unit, and wherein the third filter unit is arranged on a light incident side of a second region of the distance calculation side light receiving unit.

11. The distance measuring system according to claim 1, wherein one of the first light source and the second light source is capable of outputting a plurality of light beams having different wavelengths in a time division manner.

12. The distance measuring system according to claim 11, further comprising an output wavelength selecting unit configured to select each of wavelengths of the plurality of light beams.

13. The distance measuring system according to claim 11, further comprising a third filter unit configured to shield one of the light output from the first light source and the light output from the second light source and a part of the plurality of light beams having different wavelengths and transmit another part of the plurality of light beams having different wavelengths, wherein the first filter is arranged on a light incident side of a first region of the distance calculation side light receiving unit, and wherein the third filter unit is arranged on a light incident side of a second region of the distance calculation side light receiving unit.

14. The distance measuring system according to claim 1, wherein the first light source and the second light source are configured to simultaneously output the light having different wavelengths.

15. The distance measuring system according to claim 1, wherein the first light source and the second light source are configured to output the light having different wavelengths in a time division manner.

16. The distance measuring system according to claim 1, wherein the first light source and the second light source are mounted on a same semiconductor substrate.

17. The distance measuring system according to claim 1, wherein the light output from the first light source is reference light used for calculating the reference time, and the light output from the second light source is distance measuring light emitted to the object.

18. The distance measuring system according to claim 1, wherein the light output from the first light source is distance measuring light to be emitted to the object, and the light output from the second light source is reference light used for calculating the reference time.

19. The distance measuring system according to claim 1, further comprising a calculation wavelength selecting unit configured to select a wavelength of light used for calculating the reference time by the reference time calculating unit and a wavelength of light used for calculating the distance by the distance calculating unit.

20. A distance measuring system, comprising:

a light emitting unit, including:

a light emitting side substrate;

a first light source, wherein the first light source is operable to output light of a first wavelength, and wherein the first light source is disposed on a first side of the light emitting side substrate;

a second light source, wherein the second light source is operable to output light of a second wavelength, and wherein the second light source is disposed on the first side of the light emitting side substrate;

a light source side optical member configured to change a direction of a part of light output from each of the first light source and the second light source;

a light receiving unit, including:

a light receiving side substrate;

a light receiving element unit, wherein the light receiving element unit is mounted on the light receiving side substrate, the light receiving element unit including:

a first light receiving element;

a second light receiving element; and a first filter unit disposed on a light incident side of the second light receiving element, wherein the first filter unit blocks light of the first wavelength and transmits light of the second wavelength.

* * * * *